United States Patent
Harfst et al.

(10) Patent No.: US 10,406,715 B2
(45) Date of Patent: Sep. 10, 2019

(54) TIE RIVET FOR SAW CHAIN

(71) Applicant: Blount, Inc., Portland, OR (US)

(72) Inventors: Michael D. Harfst, Milwaukie, OR (US); Christopher D. Seigneur, West Linn, OR (US)

(73) Assignee: Blount, Inc., Portland, OR (US)

( * ) Notice: Subject to any disclaimer, the term of this patent is extended or adjusted under 35 U.S.C. 154(b) by 129 days.

(21) Appl. No.: 15/003,775

(22) Filed: Jan. 21, 2016

(65) Prior Publication Data
US 2016/0221209 A1 Aug. 4, 2016

Related U.S. Application Data

(60) Provisional application No. 62/110,328, filed on Jan. 30, 2015.

(51) Int. Cl.
*B27B 33/14* (2006.01)
*F16G 13/06* (2006.01)
*B27B 17/00* (2006.01)
*F16G 13/18* (2006.01)
*F16B 19/06* (2006.01)

(52) U.S. Cl.
CPC ............. *B27B 33/14* (2013.01); *B27B 17/00* (2013.01); *F16G 13/06* (2013.01); *F16G 13/18* (2013.01); *F16B 19/06* (2013.01)

(58) Field of Classification Search
CPC . B27B 33/14–148; F16G 13/06; F16G 13/18; F16B 19/06
USPC ................ 30/381–387; 83/830–834
See application file for complete search history.

(56) References Cited

U.S. PATENT DOCUMENTS

| 741,453 | A | * | 10/1903 | Butler et al. | ............ F16G 13/06 474/220 |
| 953,428 | A | * | 3/1910 | Morse | ...................... F16G 13/06 474/229 |
| 1,743,157 | A | * | 1/1930 | Morse | ...................... F16G 13/06 474/229 |
| 2,747,624 | A | * | 5/1956 | Cox | ...................... B27B 33/148 83/831 |
| RE24,475 | E | * | 5/1958 | Siverson | ............... B27B 33/148 83/854 |
| 2,902,068 | A | * | 9/1959 | Gudmundsen | ........ B27B 33/141 83/834 |
| 3,020,942 | A | * | 2/1962 | Hill | ....................... B27B 33/148 83/831 |

(Continued)

FOREIGN PATENT DOCUMENTS

AT          506031 B1 * 9/2009 ............. B27B 33/14
CN       203257980 U    10/2013

(Continued)

*Primary Examiner* — Jason Daniel Prone
(74) *Attorney, Agent, or Firm* — Schwabe Williamson & Wyatt, P.C.

(57) ABSTRACT

Embodiments provide a tie rivet with a body that is configured to ride on a rail of a guide bar, and an integrated rivet extending from an inner surface of the body. The integrated rivet may include a draft angle that varies over a circumference of the integrated rivet. Additionally, or alternatively, the tie rivet may include an undercut portion around at least a portion of the integrated rivet. The undercut portion may be recessed from the inner surface of the body. Other embodiments may be described and claimed.

9 Claims, 12 Drawing Sheets

(56) References Cited

U.S. PATENT DOCUMENTS

| | | | | |
|---|---|---|---|---|
| 3,291,169 | A * | 12/1966 | Morner | B27B 33/14 30/383 |
| 3,421,313 | A * | 1/1969 | Harada et al. | F16G 13/06 474/226 |
| 3,464,201 | A * | 9/1969 | Ehlen | B21J 15/50 59/7 |
| 3,585,872 | A * | 6/1971 | McDowell | F16G 13/06 474/229 |
| 3,590,650 | A * | 7/1971 | Rollins | F16G 13/06 474/229 |
| 3,931,706 | A * | 1/1976 | McKeon | B21L 9/02 474/231 |
| 4,037,403 | A * | 7/1977 | Lanz | B21L 9/00 59/35.1 |
| 4,118,995 | A * | 10/1978 | Lanz | B21L 9/00 83/831 |
| 4,378,719 | A * | 4/1983 | Burgess | B27B 33/14 83/831 |
| 4,434,556 | A * | 3/1984 | Nitschmann | B27B 33/147 83/169 |
| 4,756,221 | A * | 7/1988 | Nitschmann | B27B 33/14 83/830 |
| 4,896,575 | A * | 1/1990 | Sundstrom | B27B 33/14 83/830 |
| 4,898,057 | A * | 2/1990 | Hille | B27B 33/14 83/831 |
| 4,934,052 | A * | 6/1990 | Nitschmann | B27B 33/147 83/830 |
| 5,131,150 | A * | 7/1992 | Muehling | B23D 57/023 83/830 |
| 5,136,783 | A * | 8/1992 | Bell | B27B 17/08 30/384 |
| 5,153,996 | A | 10/1992 | Kuzarov et al. | |
| 5,386,756 | A | 2/1995 | Stehle | |
| 5,404,707 | A * | 4/1995 | Suzuki | B21G 7/02 59/71 |
| 5,651,938 | A * | 7/1997 | Thomson | B27B 33/14 420/119 |
| 5,729,882 | A * | 3/1998 | Travis | B21J 15/02 29/444 |
| 5,772,957 | A * | 6/1998 | Thomson | B27B 33/14 148/335 |
| 6,138,658 | A * | 10/2000 | Bell | B28D 1/124 83/830 |
| 6,390,943 | B1 * | 5/2002 | Dreger | F16G 13/06 474/220 |
| 6,988,862 | B1 * | 1/2006 | Iguchi | B21J 15/025 29/524.1 |
| 7,516,688 | B2 * | 4/2009 | Raczykowski | B27B 33/144 83/830 |
| 7,563,064 | B2 * | 7/2009 | Seigneur | B27B 33/14 411/504 |
| 8,342,163 | B2 * | 1/2013 | Osborne | B27B 33/14 83/830 |
| 8,602,015 | B2 * | 12/2013 | Michelon | B27B 33/14 83/830 |
| 9,233,483 | B2 * | 1/2016 | Michelon | B27B 33/14 125/21 |
| 9,573,294 | B2 * | 2/2017 | Buchholtz | B23D 65/00 451/298 |
| 9,757,808 | B2 * | 9/2017 | Harfst | B23D 65/00 83/130 |
| 2004/0182216 | A1 * | 9/2004 | Morrison | B27B 33/14 83/661 |
| 2007/0026987 | A1 * | 2/2007 | Miura | B21L 15/005 474/206 |
| 2007/0125219 | A1 | 6/2007 | Seigneur et al. | |
| 2009/0017950 | A1 * | 1/2009 | Sandro | F16G 13/06 474/231 |
| 2012/0132051 | A1 * | 5/2012 | Moller | B28D 1/124 83/830 |
| 2013/0121788 | A1 | 5/2013 | Yu | |
| 2013/0319201 | A1 * | 12/2013 | Schulz | B27B 33/14 83/830 |
| 2014/0260875 | A1 | 9/2014 | Harfst | |
| 2014/0298963 | A1 * | 10/2014 | Ruzich | B23D 61/025 83/830 |
| 2016/0193749 | A1 * | 7/2016 | Seigneur | B27B 33/14 83/830 |
| 2017/0197327 | A1 * | 7/2017 | Harfst | B27B 33/141 83/830 |

FOREIGN PATENT DOCUMENTS

| | | | | |
|---|---|---|---|---|
| DE | 102006037330 A1 * | 2/2008 | | B27B 33/14 |
| EP | 0304270 A2 | 2/1989 | | |
| EP | 3042742 A1 * | 7/2016 | | B27B 33/14 |
| EP | 3050685 A1 * | 8/2016 | | |
| EP | 2663432 B1 * | 8/2017 | | B27B 33/14 |
| FR | 2323481 A1 * | 4/1977 | | B27B 33/14 |
| FR | 2695060 A1 * | 3/1994 | | B27B 33/14 |
| FR | 2702988 A1 * | 9/1994 | | B27B 33/14 |
| GB | 888980 A | 2/1962 | | |
| WO | WO97/33731 A1 | 9/1997 | | |
| WO | WO 2008061204 A2 * | 5/2008 | | B27B 33/14 |

* cited by examiner

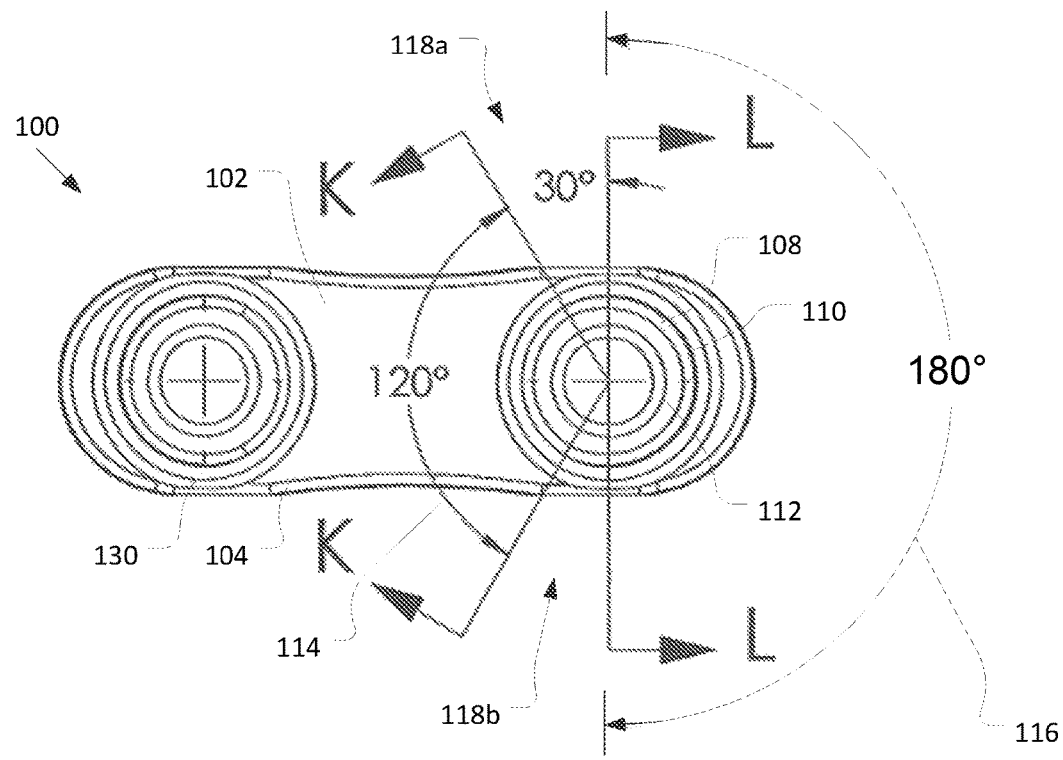
Figure 1B
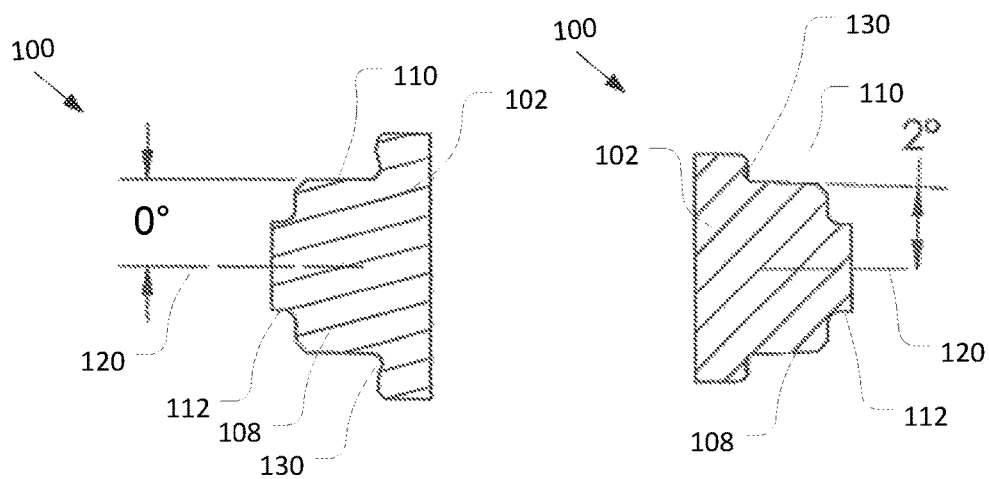
Figure 1C
Figure 1D

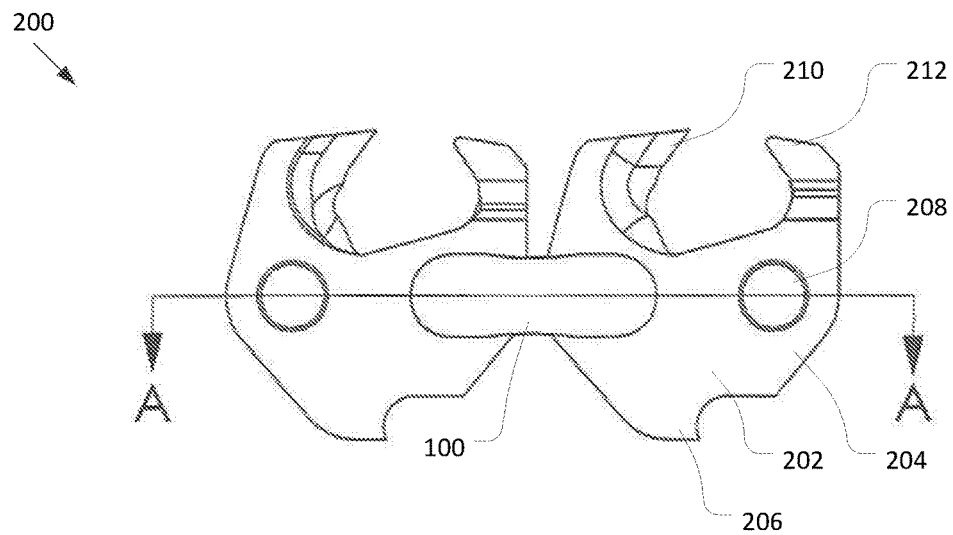
Figure 2A
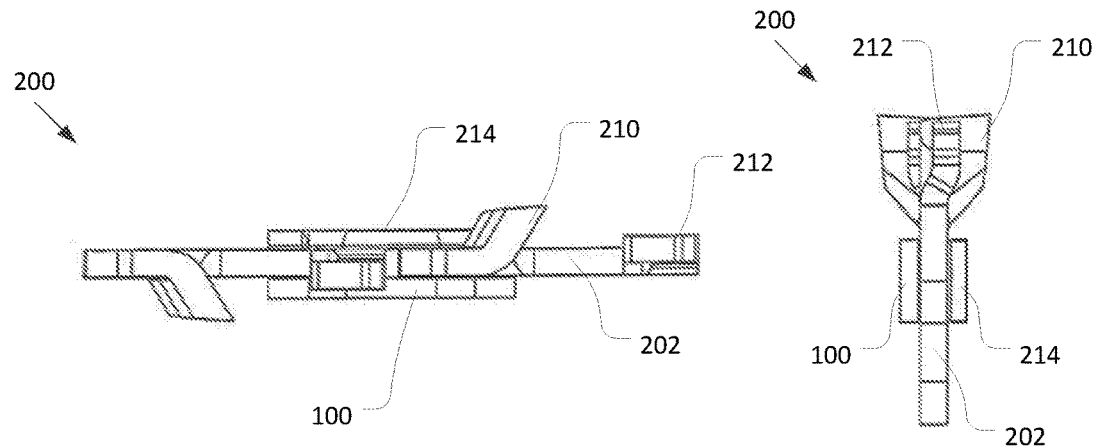
Figure 2B
Figure 2C

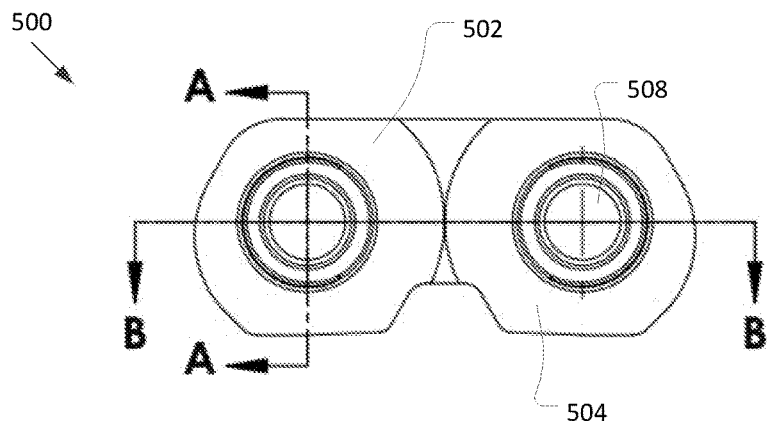
Figure 5A
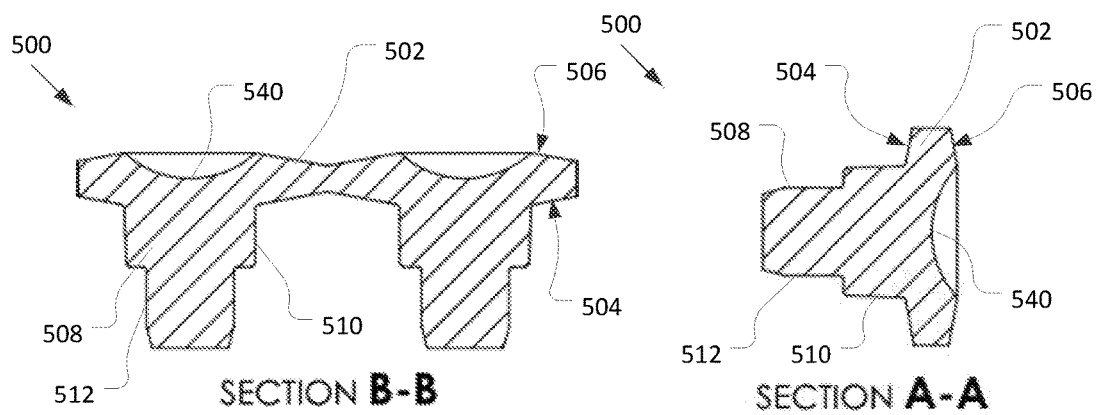
Figure 5C  Figure 5B

TIE RIVET FOR SAW CHAIN

CROSS REFERENCE TO RELATED APPLICATIONS

The present application claims priority to U.S. Provisional Patent Application No. 62/110,328, filed Jan. 30, 2015, entitled "TIE RIVET FOR SAW CHAIN," the entire disclosure of which is hereby incorporated by reference.

TECHNICAL FIELD

Embodiments herein relate to the field of saw chains, and, more specifically, to tie rivets for saw chains.

BACKGROUND

Saw chains for chainsaws typically include a plurality of links, such as cutter links, drive links, and tie straps, coupled to one another by rivets. The rivets are typically manufactured separately from the links, and the rivets can come loose during operation of the saw chain. Furthermore, for small saw chains, the small rivets and links can be difficult to manipulate.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIG. 1B illustrates a side view of the tie rivet of FIG. 1A in accordance with various embodiments.

FIG. 1C illustrates a cross-sectional view of the tie rivet of FIG. 1B along the line K-K shown in FIG. 1B, in accordance with various embodiments.

FIG. 1D illustrates a cross-sectional view of the tie rivet of FIG. 1B along the line L-L shown in FIG. 1B, in accordance with various embodiments.

FIG. 2A illustrates a side view of a saw chain in accordance with various embodiments.

FIG. 2B illustrates a top view of the saw chain of FIG. 2A in accordance with various embodiments.

FIG. 2C illustrates a front view of the saw chain of FIG. 2A in accordance with various embodiments.

FIG. 5A illustrates a side view of another tie rivet in accordance with various embodiments.

FIG. 5B illustrates a cross-sectional view of the tie rivet of FIG. 5A along the line A-A shown in FIG. 5A, in accordance with various embodiments.

FIG. 5C illustrates a cross-sectional view of the tie rivet of FIG. 5A along the line B-B shown in FIG. 5A, in accordance with various embodiments.

DETAILED DESCRIPTION OF DISCLOSED EMBODIMENTS

Figure 1A:
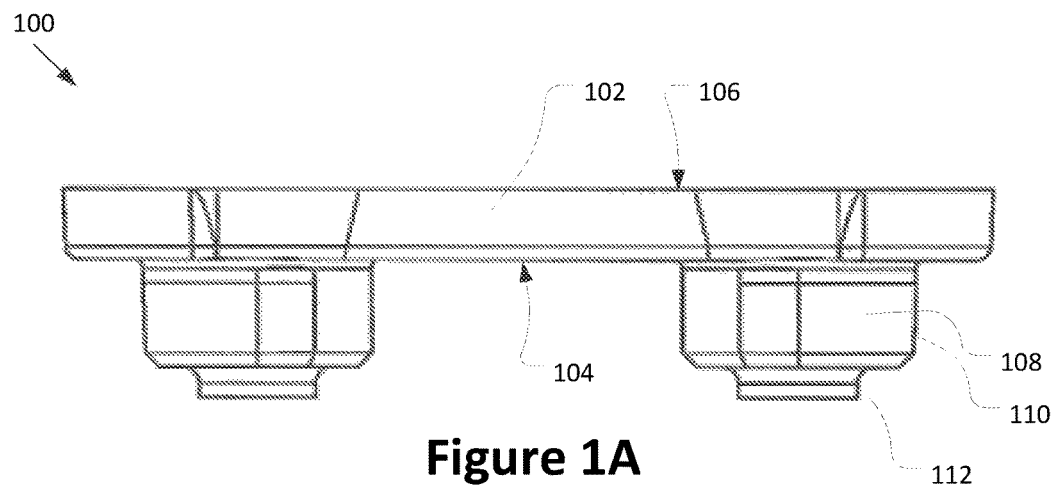
FIG. 1A illustrates a top view of a tie rivet in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide apparatuses, systems, and methods related to a tie rivet for a saw chain. Embodiments further provide a saw chain that includes a plurality of links coupled to one another in a chain, including one or more tie rivets. The tie rivet may include a body portion (also referred to as tie strap portion) that has a length configured to couple adjacent links, such as drive links, of a saw chain to one another. The tie rivet may further include one or two rivets that extend from the body of the tie strap. The rivets may be disposed in and/or engage with a rivet hole of a connecting link (e.g., a drive link) to couple the connecting link to another link. In some embodiments, the rivets may further couple the tie rivet to an opposing tie strap on the other side of the connecting link.

In various embodiments, saw chain may be configured to be driven on a guide bar of a chain saw. The guide bar may extend from a body of the chain saw and may generally include a pair of elongate portions running from a proximal end of the guide bar (closer to the body) to a distal end of the guide bar (further from the body). The elongate portions may be straight or may have a slight curvature. In some embodiments, the elongate portions may include a pair of rails, with a groove disposed between the rails.

The guide bar may further include a sprocket at the proximal and/or distal end to drive the saw chain around the ends of the guide bar. For example, the guide bar may include a drive sprocket at the proximal end of the guide bar and a nose sprocket at the distal end of the guide bar. The sprocket may include a spur with a plurality of pockets to engage respective links of the saw chain. In some embodiments, the sprocket may further include a pair of rims with outer edges that define rails. The spur may be sandwiched between the pair of rims. Other embodiments of the sprocket may not include rims.

In various embodiments, the saw chain may include a plurality of links coupled to one another in a chain. For example, the saw chain may include one or more cutter links, drive links, and/or tie straps. The cutter links may include a sharpened cutting edge for cutting a workpiece (e.g., wood). In some embodiments, the cutter links may further include a depth gauge to control a depth of cut of the cutter link. For example, the depth gauge may be disposed in front of the cutting element (e.g., in the direction of travel of the saw chain).

In various embodiments, the drive links may be center links configured for riding in the groove of the guide bar and/or to engage with one or more sprockets of the guide bar. For example, the drive links may include a tang that extends downward from a body of the drive link to ride in the groove of the guide bar and/or engage a pocket of the sprocket.

Additionally, or alternatively, some embodiments may provide a saw chain including cutter links integrated into a drive link. Such a link may be referred to as a cutter drive link. The cutter drive link may include a body with a tang extending downward from the body, and a cutting element and depth gauge extending upward from the body. Some embodiments may provide a saw chain including a plurality of cutter drive links coupled to one another by tie rivets as described herein. In some embodiments, the saw chain may include only cutter drive links and tie straps, and some or all of the tie straps may be tie rivets as described herein.

In other embodiments, the saw chain may include tie strap cutter links (e.g., a tie strap with an integrated cutting element and depth gauge). One or more of the tie strap cutter links may be a tie rivet as described herein. Accordingly, the tie strap cutter links may include one or more integrated rivets, a cutting element, and a depth gauge. The tie strap cutter links may be coupled to an opposing tie strap and connecting drive links. The opposing tie strap and connecting drive links may be non-cutting links.

As discussed above, the tie rivet may include a body and at least one rivet extending from the body. The body may include an outer surface and an inner surface. The outer surface may generally face away from a connecting link to which the tie strap is coupled, and the inner surface may generally face the connecting link. The one or more rivets may extend from the inner surface. In some embodiments, the body may be substantially flat. For example, the outer surface and/or inner surface of the body may be substantially flat (e.g., planar). In some embodiments, the outer surface and inner surface may be substantially parallel to one another.

The tie rivet may ride on one of the rails of the guide bar. For example, the tie rivet may include a pair of foot portions on a bottom surface of the body. The foot portions may contact the rail as the tie rivet traverses the guide bar. The foot portions may be separated on the bottom surface of the body or may be included in a continuous portion of the bottom surface.

In some embodiments, the tie rivet may further include a second pair of foot portions on a top surface of the body. This may allow the tie rivet to be reversible.

In various embodiments, the integrated rivet of the tie rivet may include a shoulder and a hub. The shoulder may be configured to be disposed in a rivet hole of the connecting link (e.g., drive link). The hub may be configured to be disposed in or engage with a rivet hole of the opposing tie strap. In various embodiments, the shoulder may provide a gap between the opposing tie straps to provide clearance for the connecting links between the tie straps. In some embodiments, a radius of the shoulder may be greater than a radius of the hub (e.g., as measured from a common center line) to facilitate the gap. For example, the radius of the shoulder may be greater than a radius of the rivet hole in the opposing tie strap.

In some embodiments, the rivet hole in the opposing tie strap may extend completely through the body of the opposing tie strap. Alternatively, the rivet hole may be defined by a depression in the body of the opposing tie strap that is recessed from the inner surface of the body. The hub of the tie rivet may engage with the rivet hole in the opposing tie strap to keep the tie rivet connected to the opposing tie strap.

For example, in some embodiments, a rivet head may be formed by spinning the hub, such as by a spinning anvil. Alternatively, the rivet may include a concavity in the end of the rivet that may be struck with an implement to spread the end of the rivet to form a rivet head. In other embodiments, the rivet head may be a crushed head. In yet other embodiments, the rivet head may be a flush head that has a same or similar radius to the hub. The flush head may be joined to the rivet hole of the opposing tie strap, such as by resistance welding, laser welding, ion-beam welding, or another non-mechanical joining process.

In various embodiments, the integrated rivet of the tie rivet may include a variable draft angle along a circumference of the side surface of the tie rivet. The draft angle may refer to an angle of the side surface of the rivet with respect to a center line through the axial center of the rivet. The rivet may have a non-zero draft angle over at least a portion of the surface of the tie rivet to facilitate removal of the tie rivet from a mold that is used to manufacture the tie rivet.

For example, the side surface of the rivet may have a draft angle with a first value over a first portion of the circumference of the side surface, and may have a draft angle with a second value over a second portion of the circumference of the side surface. The second value may be greater than the first value. The side surface may further include transition portions between the first portion and the second portion. The draft angle of the side surface may change from the first value to the second value (e.g., substantially continuously) over the transition portions. In one example, the first value may be about 0 degrees (e.g., the side surface may be substantially parallel with the center line), and the second value may be about 1 to about 5 degrees (e.g., about 2 degrees).

It will be apparent that other values of the draft angle may be provided in other embodiments. For example, in some embodiments, the first value and the second value may both be non-zero. Alternatively, in some embodiments, the draft angle may continuously change over the entire circumference of the side surface of the rivet, or over the entire circumference apart from the first portion.

The first portion, second portion, and/or transition portions may cover any suitable portion of the circumference of the side surface. For example, in some embodiments, the first portion may cover about 90 degrees to about 180 degrees (e.g., about 120 degrees) of the circumference, the second portion may cover about 120 degrees to about 240 degrees (e.g., about 180 degrees) of the circumference, and/or the transition portions may individually cover about 15 degrees to about 45 degrees (e.g., about 30 degrees) of the circumference.

In various embodiments, the first portion of the side surface (e.g., with the lower draft angle) may be disposed in a contact region of the rivet. The contact region may be a region of the side surface that is subjected to the greatest contact force with the connecting link. For example, in some embodiments, the contact region may be an inner region of the rivet that faces the other rivet of the tie rivet (or the rivet of the opposing tie strap in embodiments in which the tie rivet includes a single integrated rivet). The lower draft angle (e.g., 0 draft angle) of the first portion may facilitate contact between the side surface of the rivet and the rivet hole of the connecting link. Additionally, the higher draft angle of the second portion may facilitate manufacturing of the tie rivet. Furthermore, the tie rivet with variable draft angle as described herein may allow the tie rivet to be manufactured with less costly (e.g., less strict) tolerances, with less expensive tools, and/or using simpler induction heat treat coils than prior saw chain links.

In some embodiments, the integrated rivet of the tie rivet may include a variable draft angle over only a portion of the length of the side surface. For example, in some embodiments, the rivet may include a variable draft angle over all or a portion of the shoulder of the rivet, and may include a substantially constant draft angle over the hub of the rivet.

Conventional rivets typically include a 0 draft angle over the entire circumference of the shoulder of the rivet. This is required since the separate rivet is not oriented with respect to the tie strap until the saw chain is assembled. Additionally, the rivet may rotate with respect to the tie strap over time, e.g., if the mechanical interference between the spun rivet hub and the rivet hole of the tie strap is insufficient. However, the integrated rivets of the tie rivet disclosed herein have a fixed orientation with respect to the tie strap portion (body), which allows the portions of the side surface having different draft angles to be properly oriented.

Figure 1E:
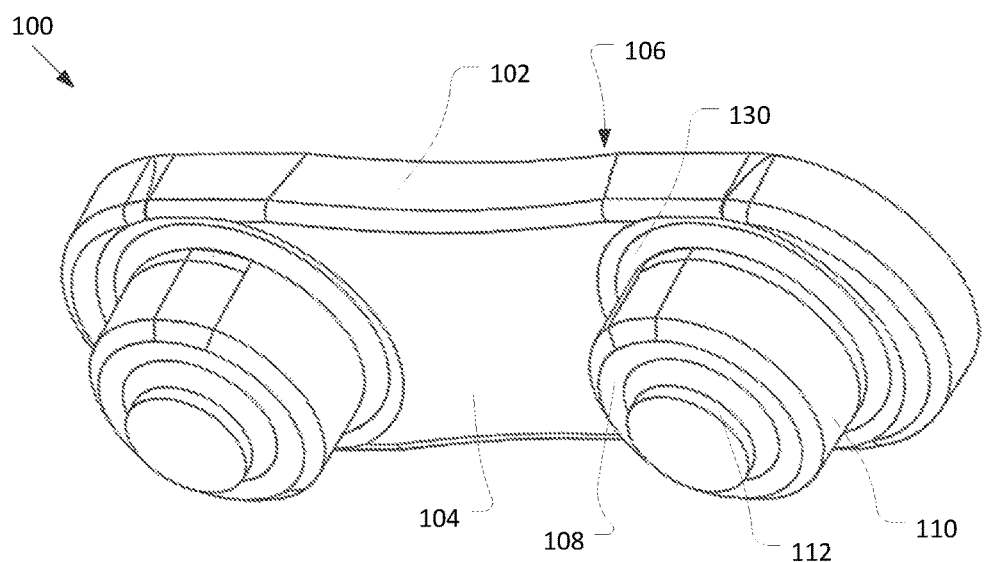
FIG. 1E is a perspective view of the tie rivet of FIG. 1A, in accordance with various embodiments.

FIGS. 1A-1E illustrate a tie rivet 100 in accordance with various embodiments. FIG. 1A is a top view of the tie rivet 100, and FIG. 1B is a side view of the tie rivet 100. FIG. 1C shows a cross-sectional view of the tie rivet 100 along the line K-K shown in FIG. 1B, and FIG. 1D shows a cross-sectional view of the tie rivet 100 along the line L-L shown in FIG. 1B. FIG. 1E is a perspective view of the tie rivet 100.

Tie rivet 100 includes a body 102 with an inner surface 104 and an outer surface 106. Tie rivet 100 further includes integrated rivets 108 that extend from the inner surface 104. The integrated rivets 108 form a unitary piece with the body 102, as opposed to a separate tie strap and rivets. The integrated rivets 108 include a shoulder 110 and a hub 112. The shoulder 110 is disposed between the body 102 and the hub 112, and has a diameter that is larger than a diameter of the hub 112.

As best seen in FIG. 1B, the circumference of the rivet 108 is divided into a first portion 114, a second portion 116, and transition portions 118a and 118b disposed between the first portion 114 and the second portion 116. As shown in FIG. 1C, over the first portion 114, the surface of the shoulder 110 has a draft angle of 0 degrees with respect to an axial center line 120 disposed through the axial center of the rivet 108. Additionally, as shown in FIG. 1D, over the second portion 116, the surface of the shoulder 110 has a draft angle of 2 degrees with respect to the center line 120. The draft angle may gradually increase from 0 degrees to 2 degrees over the transition portions 118a-b.

The hub 112 is shown in FIG. 1B with a draft angle of 0 degrees over an entire circumference of the hub 112. In other embodiments, the hub 112 may include a non-zero draft angle over all or a portion of the circumference of the hub 112.

As shown in FIG. 1B, the first portion 114 may cover 120 degrees of the circumference of the rivet 108, the second portion 116 may cover 180 degrees of the circumference of the rivet 108, and the transition portions 118a and 118b may each cover 30 degrees of the circumference of the rivet 108. The radial lengths of the first portion 114, second portion 116, and transition portions 118a-b, as well as the values of the draft angles of each portion, are presented as examples. It will be apparent that other radial lengths and/or draft angles of the first portion 114, second portion 116, and/or transition portions 118a-b may be used in other embodiments.

As discussed above, the lower draft angle (e.g., 0 draft angle) of the first portion 114 may facilitate contact between the surface of the shoulder 110 and the rivet hole of the connecting link. Additionally, the higher draft angle (e.g., 2 degree draft angle) of the second portion 116 may facilitate manufacturing of the tie rivet.

The first portion 114 of the rivet 108, with the 0 draft angle, may be disposed in a contact region of the rivet 108. The contact region may be a region of the side surface of the rivet 108 that is subjected to the greatest contact force with the connecting link. For example, as shown in FIG. 1B, the contact region may be an inner region of the rivet 108 that faces the other rivet 108 of the tie rivet 100.

Figure 2D:
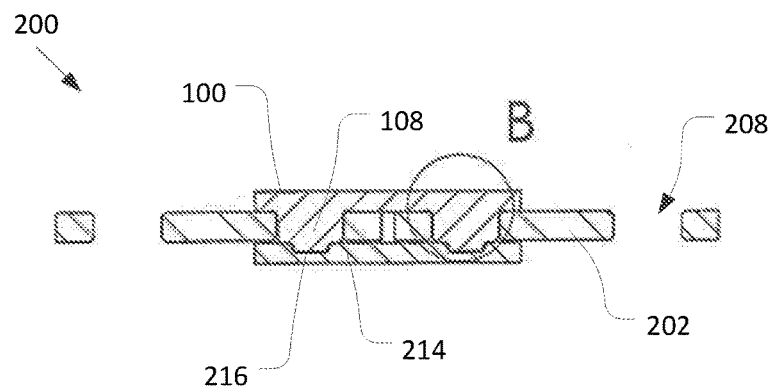
FIG. 2D illustrates a cross-sectional view of the saw chain of FIG. 2A along the line A-A shown in FIG. 2A, in accordance with various embodiments.
Figure 2E:
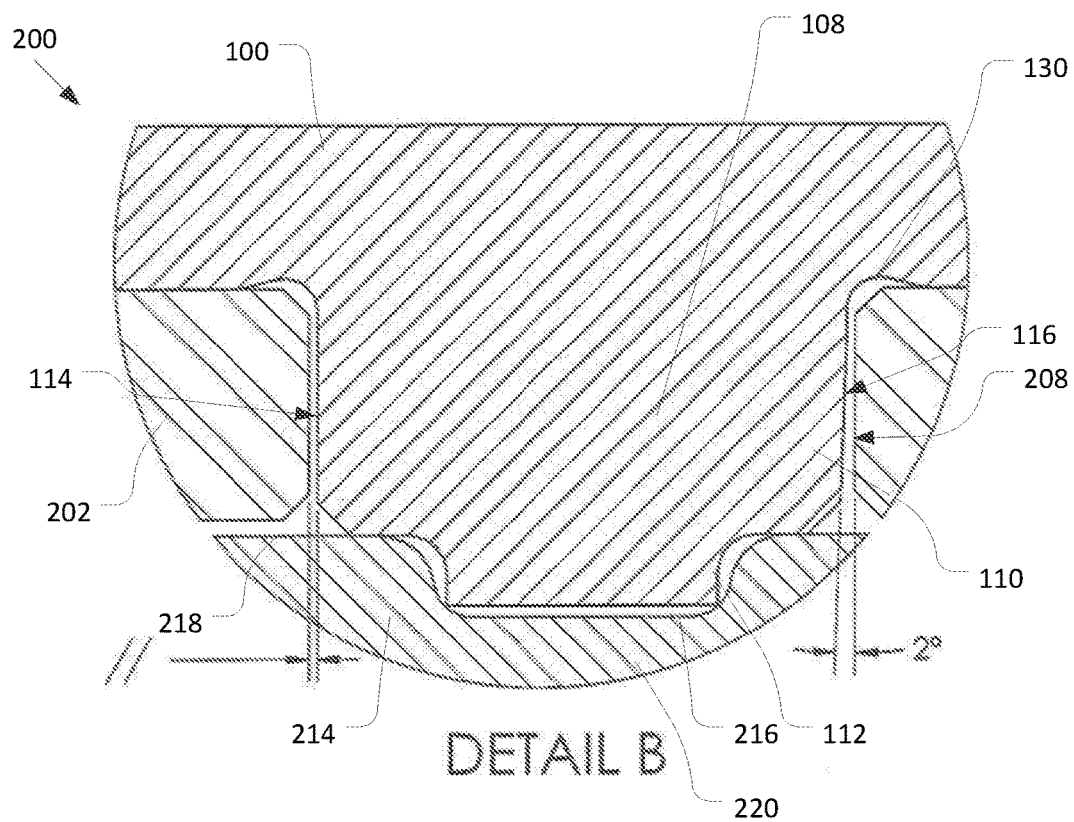
FIG. 2E illustrates an expanded view of the portion marked B in FIG. 2D, in accordance with various embodiments.

FIGS. 2A-2E illustrate a portion of a saw chain 200 that includes the tie rivet 100 in accordance with various embodiments. FIG. 2A illustrates a side view of the saw chain 200, FIG. 2B illustrates a top view of the saw chain 200, and FIG. 2C illustrates a front view of the saw chain 200. FIG. 2D illustrates a cross-sectional view of the saw chain 200 along the line A-A shown in FIG. 2A. FIG. 2E illustrates an expanded view of the portion marked B in FIG. 2D.

The saw chain 200 includes two drive cutter links 202 coupled to one another by the tie rivet 100. The drive cutter links 202 include a body 204 with a tang 206 that is configured to ride in a groove of a guide bar (not shown) between the rails of the guide bar. The drive cutter links 202 further include a pair of rivet holes 208 extending through the body 204. Additionally, the drive cutter links 202 include a sharpened cutting edge 210 and a depth gauge 212 extending upward from the body 204.

The rivets 108 of the tie rivet 100 extend through respective rivet holes 208 of the drive cutter links 202 to couple the drive cutter links 202 to one another. The rivet holes 208 are disposed around the shoulder 110 of the rivets 108.

The saw chain 200 further includes an opposing tie strap 214 opposite the tie rivet 100. As best seen in FIG. 2E, the tie strap 214 includes a pair of rivet holes 216 to receive respective rivets 108 of the tie rivet 100 (e.g., to receive the hubs 112 of the respective rivets 108). The rivet holes 216 are recessed from an inner surface 218 of a body 220 of the tie strap 214, but do not extend all the way through the body 220. In other embodiments, the rivet holes 216 may extend all the way through the body 220.

The rivet holes 216 have a diameter that is greater than the diameter of the hubs 112 of the rivets 108, but less than the diameter of the shoulders 110 of the rivets 108. The hubs 112 may engage with the rivet holes 216 to hold the connection between the tie rivet 100 and the tie strap 214. For example, the hubs 112 may form an interference fit with the rivet holes 216, or may be joined to the rivet holes 216 by resistance welding, laser welding, ion-beam welding, or another non-mechanical joining process.

As best seen in FIG. 2E, the shoulder 110 of the rivet 108 has a draft angle of 0 degrees on the first portion 114 of the shoulder 110 and has a draft angle of 2 degrees on the second portion 116 of the shoulder 110. The 0 degree draft angle on the first portion 114 of the shoulder 110 may facilitate contact between the shoulder 110 and the rivet hole 208 of the drive cutter link 202 in the first portion 114 of the shoulder 110. The increased draft angle on the second portion 116 of the shoulder 110 may facilitate manufacture of the tie rivet 100.

In various embodiments, in addition to or instead of a variable draft angle, the tie rivet described herein may have an undercut portion disposed around all or part of the integrated rivets. The undercut portion may be defined by a region of the tie rivet which is recessed from the inner surface of the body (e.g., toward the outer surface of the body). In some embodiments, the undercut portion may be curved (e.g., radiused) to form a continuous curved surface between the inner surface of the body and the rivet.

The undercut portion may facilitate the fit between the connecting links (e.g., drive links) and the tie rivet. For example, the undercut portion may provide clearance for the drive link (e.g., the edge of the rivet hole of the drive link) to get closer to the inner surface of the tie rivet. Additionally, or alternatively, the undercut portion may allow a tighter fit between the rivet hole of the drive link and the rivet of the tie rivet (e.g., may allow the drive link to have rivet holes that have a width that is closer to the width of the corresponding rivet of the tie rivet). Furthermore, the undercut portion may increase fatigue strength of the tie rivet.

Accordingly, the undercut radius may allow the saw chain to have smaller gaps between adjacent connecting links (e.g., drive links). Additionally, droopiness of the saw chain may be reduced by tighter fits between the rivet holes of the connecting links and the rivets of the tie rivet.

In some embodiments, the tie rivet may include the undercut portion on only a portion of the circumference of the rivet. For example, the undercut portion may be included in the contact region of the rivet. As discussed above, the contact region may be the portion of the circumference of the rivet that is subjected to the greatest contact force with the connecting link. For example, in some embodiments, the contact region may be an inner region of the rivet that faces the other rivet of the tie rivet (or the rivet of the opposing tie strap in embodiments in which the tie rivet includes a single integrated rivet).

In some embodiments, the tie rivet may include an undercut portion in a first portion of the circumference of the rivet, and may not include an undercut portion in a second portion of the circumference of the rivet. The tie rivet may further include transition portions between the first and second portions over which a depth of the undercut portion gradually changes from the depth of the undercut portion in the first portion to the depth of the undercut portion (e.g., 0 depth) in the second portion. The first portion, second portion, and transition portions may or may not correspond to the first portion, second portion, and transition portions discussed above with respect to the variable draft angle.

In other embodiments, the tie rivet may include the undercut portion around the entire circumference of the rivet.

Figure 3:
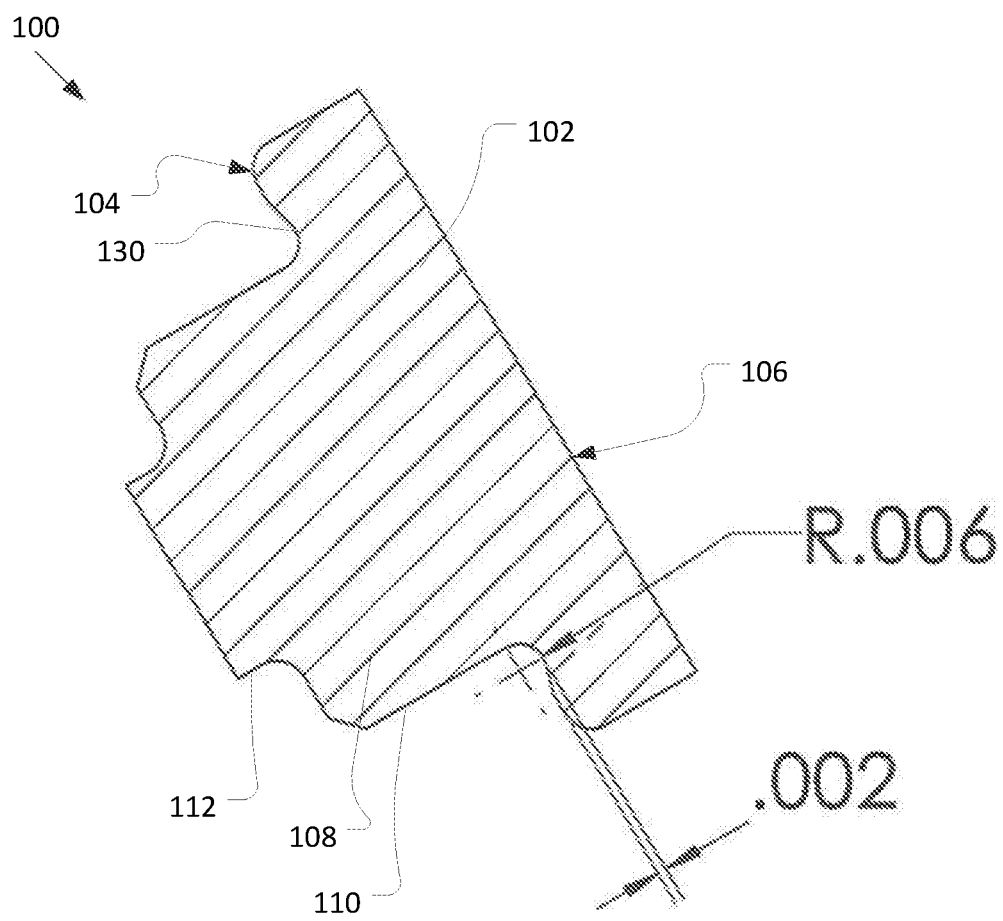
FIG. 3 illustrates another cross-sectional view of the tie rivet of FIG. 1B along the line K-K shown in FIG. 1B, in accordance with various embodiments.

Referring again to FIGS. 1A-1E, the tie rivet 100 includes undercut portions 130 disposed around the base of the rivets 108. FIG. 3 illustrates another cross-sectional view of the tie rivet 100 along the line K-K shown in FIG. 1B. The undercut portion 130 is recessed from an innermost portion of the inner surface 104. For example, as shown in FIG. 3, a depth of the undercut portion 130 is about 0.002 inches from the innermost portion of the inner surface 104. Other embodiments may include another suitable depth of the undercut portion 130.

Additionally, the undercut portion 130 is curved to provide a continuous smooth surface between the inner surface 104 and the rivet 108. For example, as shown in FIG. 3, a radius of the undercut portion 130 is about 0.006 inches. Other embodiments may include another suitable radius of the undercut portion 130.

The undercut portion 130 may extend around the entire circumference of the rivets 108. In other embodiments, the tie rivet 100 may include an undercut portion with a first depth over the first portion 114 of the circumference of the rivets 108, and the tie rivet 100 may not include an undercut portion over the second portion 116 of the circumference of the tie rivets 108. Additionally, the depth of the undercut portion may gradually decrease over the transition portions 118a-b from the first portion 114 to the second portion 116. Alternatively, the tie rivet 100 may have a non-zero undercut portion in the second portion 116 with a depth that is less than the depth of the undercut portion 130 in the first portion 114.

Figure 4A:
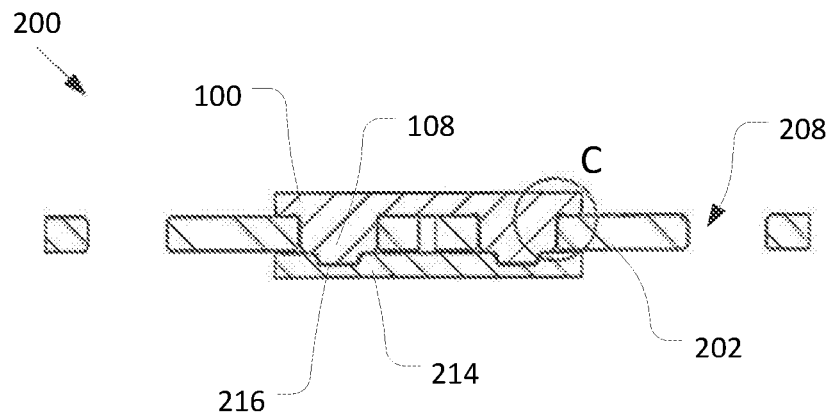
FIG. 4A illustrates another cross-sectional view of the saw chain of FIG. 2A along the line A-A shown in FIG. 2A, in accordance with various embodiments.
Figure 4B:
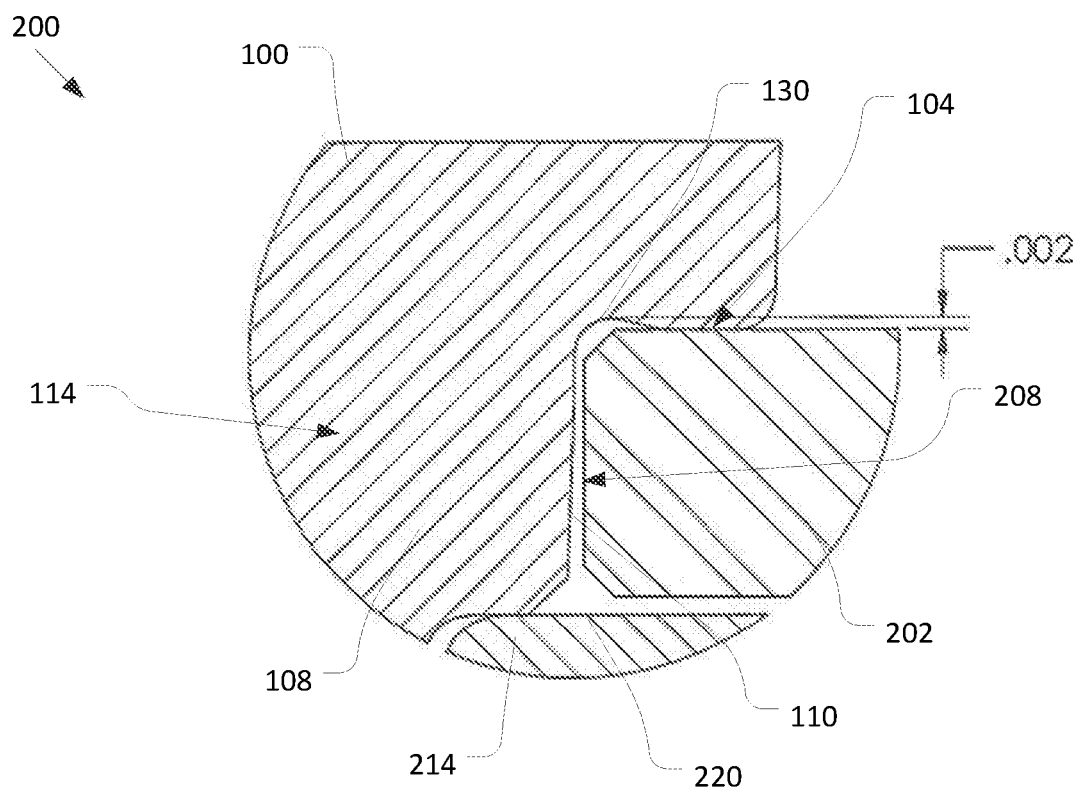
FIG. 4B illustrates an expanded view of the portion marked C in FIG. 4A.

FIG. 4A illustrates another cross-sectional view of the saw chain 200 along the line A-A shown in FIG. 2A, similar to FIG. 2D. FIG. 4B illustrates an expanded view of the portion marked C in FIG. 4A.

As best seen in FIG. 4B, the undercut portion 130 of the tie rivet 100 allows the drive cutter link 202 to be close (e.g., in contact with) the inner surface 104 of the tie rivet 100. Additionally, undercut portion 130 may allow the rivet hole 208 of the drive cutter link 202 to have a width that is relatively close to the width of the shoulder 110 of the rivet 108, thereby facilitating the fit between the rivet 108 and the rivet hole 208.

The tie rivet described herein may be manufactured using any suitable manufacturing process. For example, in some embodiments, the tie rivet may be formed using machining, casting, hot or cold forging, progressive forming, powder metal injection, metal injection molding, three-dimensional (3D) additive manufacturing processes, laser welding of the rivet to the tie strap body, or another forming process.

FIGS. 5A-5C illustrate a tie rivet 500 in accordance with various embodiments. FIG. 5A illustrates a side view of the tie rivet 500. FIG. 5B illustrates a cross-sectional view of the tie rivet 500 along the line A-A shown in FIG. 5A, and FIG. 5C illustrates a cross-sectional view of the tie rivet 500 along the line B-B shown in FIG. 5A.

Tie rivet 500 includes a body 502 with an inner surface 504 and an outer surface 506. Tie rivet 500 further includes integrated rivets 508 that extend from the inner surface 504. The integrated rivets 508 form a unitary piece with the body 502, as opposed to a separate tie strap and rivets. The integrated rivets 508 include a shoulder 510 and a hub 512. The shoulder 510 is disposed between the body 502 and the hub 512, and has a diameter that is larger than a diameter of the hub 512.

The outer surface 506 includes a recession 540 in an area that corresponds to a location of the rivet 508. The outer surface 506 further includes a draft angle that slopes down away from the recession 540.

Additionally, the inner surface 504 includes a draft angle that slopes away from the rivets 508. The recession 540 and/or draft angles of the outer surface 506 and/or inner surface 504 may facilitate manufacture of the tie rivet 500.

Figure 6A:
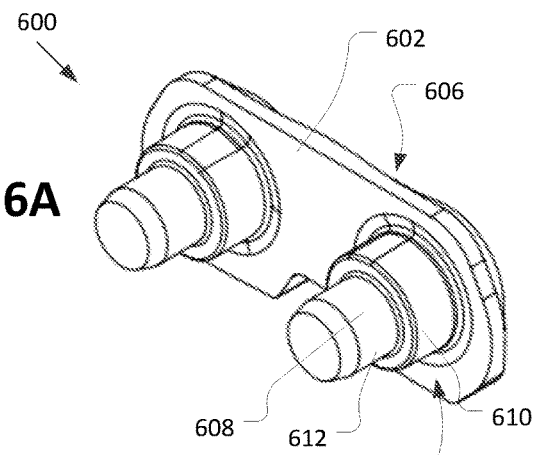
FIG. 6A illustrates a perspective view of another tie rivet in accordance with various embodiments.
Figure 6B:
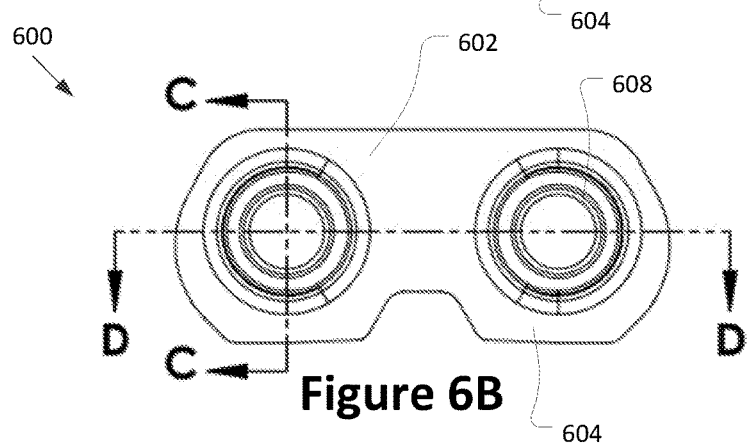
FIG. 6B illustrates a side view of the tie rivet of FIG. 6A, in accordance with various embodiments.
Figure 6D:
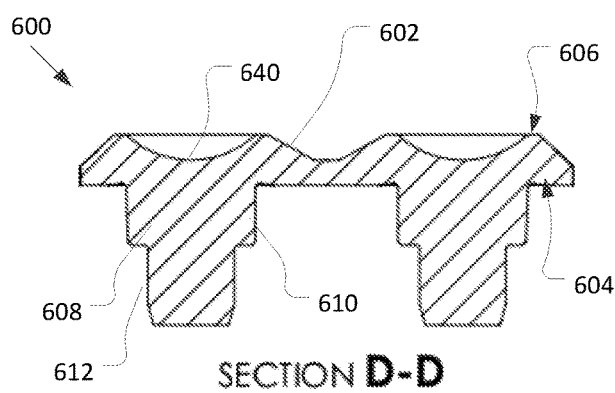
FIG. 6D illustrates a cross-sectional view of the tie rivet of FIG. 6B along the line D-D shown in FIG. 6B, in accordance with various embodiments.
Figure 6C:
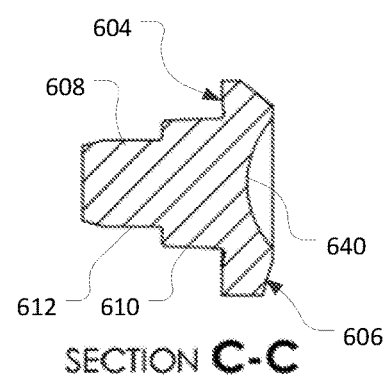
FIG. 6C illustrates a cross-sectional view of the tie rivet of FIG. 6B along the line C-C shown in FIG. 6B, in accordance with various embodiments.

FIGS. 6A-6D illustrate another tie rivet 600 in accordance with various embodiments. FIG. 6A illustrates a perspective view of the tie rivet 600, and FIG. 6B illustrates a side view of the tie rivet 600. FIG. 6C illustrates a cross-sectional view of the tie rivet 600 along the line C-C shown in FIG. 6B, and FIG. 6D illustrates a cross-sectional view of the tie rivet 600 along the line D-D shown in FIG. 6B.

Tie rivet 600 includes a body 602 with an inner surface 604 and an outer surface 606. Tie rivet 600 further includes integrated rivets 608 that extend from the inner surface 604. The integrated rivets 608 form a unitary piece with the body 602, as opposed to a separate tie strap and rivets. The integrated rivets 608 include a shoulder 610 and a hub 612. The shoulder 610 is disposed between the body 602 and the hub 612, and has a diameter that is larger than a diameter of the hub 612.

The outer surface 606 includes a recession 640 in an area that corresponds to a location of the rivet 608. The outer surface 606 further includes a draft angle that slopes down away from the recession 640. The recession 640 and/or draft angle of the outer surface 606 may facilitate manufacture of the tie rivet 600.

Figure 7A:
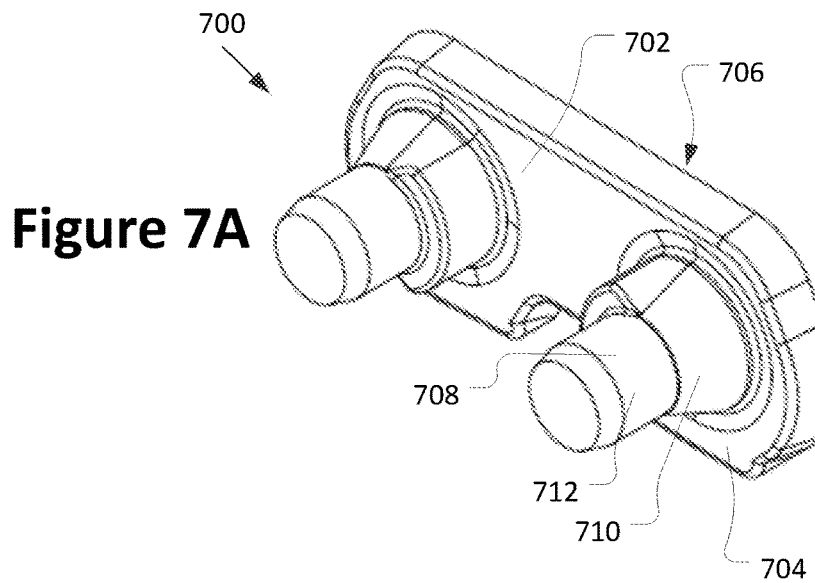
FIG. 7A illustrates a perspective view of another tie rivet in accordance with various embodiments.
Figure 7B:
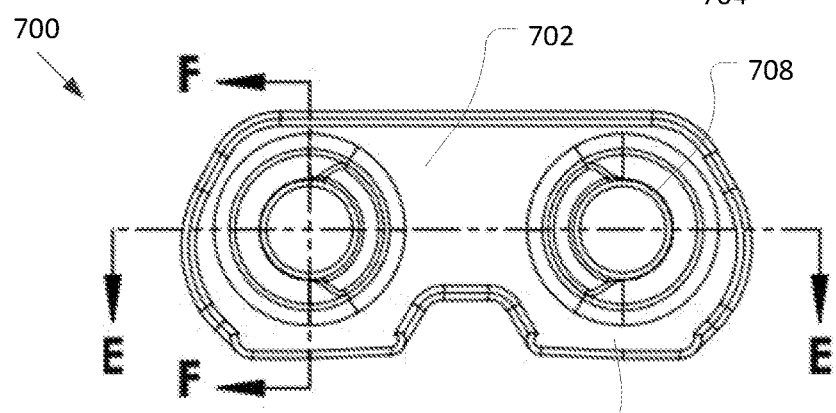
FIG. 7B illustrates a side view of the tie rivet of FIG. 7A in accordance with various embodiments.
Figure 7C:
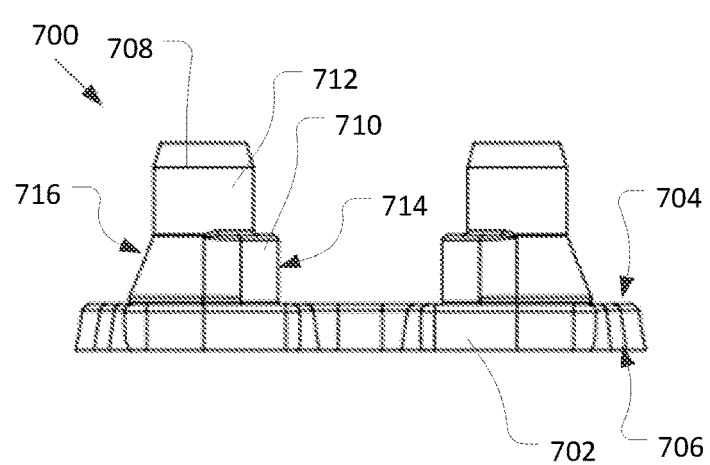
FIG. 7C illustrates a bottom view of the tie rivet of FIG. 7A in accordance with various embodiments.
Figure 7D:
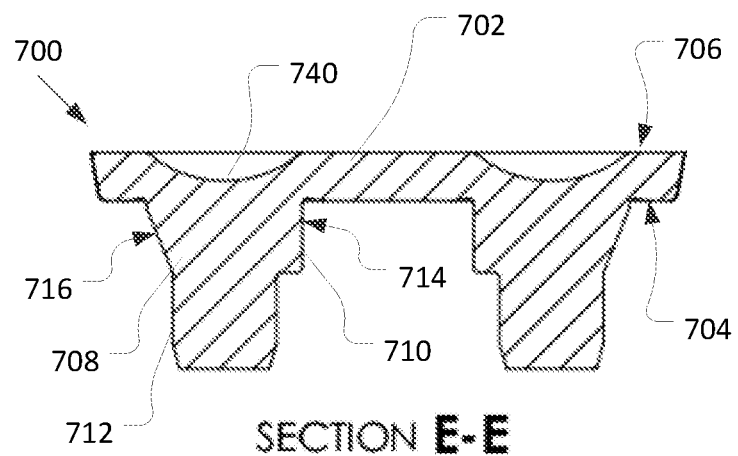
FIG. 7D illustrates a cross-sectional view of the tie rivet of FIG. 7B along the line E-E shown in FIG. 7B, in accordance with various embodiments.
Figure 7E:
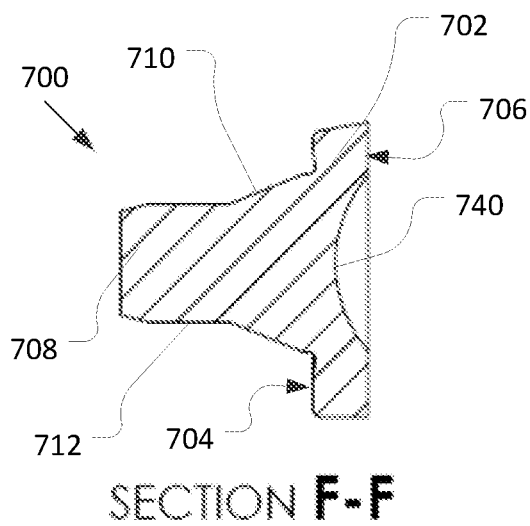
FIG. 7E illustrates a cross-sectional view of the tie rivet of FIG. 7B along the line F-F shown in FIG. 7B, in accordance with various embodiments.

FIGS. 7A-7E illustrate another tie rivet 700 in accordance with various embodiments. FIG. 7A illustrates a perspective view of the tie rivet 700, FIG. 7B illustrates a side view of the tie rivet 700, and FIG. 7C illustrates a bottom view of the tie rivet 700. FIG. 7D illustrates a cross-sectional view of the tie rivet 700 along the line E-E shown in FIG. 7B, and FIG. 7E illustrates a cross-sectional view of the tie rivet 700 along the line F-F shown in FIG. 7B.

Tie rivet 700 includes a body 702 with an inner surface 704 and an outer surface 706. Tie rivet 700 further includes integrated rivets 708 that extend from the inner surface 704. The integrated rivets 708 form a unitary piece with the body 702, as opposed to a separate tie strap and rivets. The integrated rivets 708 include a shoulder 710 and a hub 712. The shoulder 710 is disposed between the body 702 and the hub 712, and has a diameter that is larger than a diameter of the hub 712.

The outer surface 706 includes a recession 740 in an area that corresponds to a location of the rivet 708. Additionally, the shoulder 710 of the rivet 708 includes a variable draft angle, with a 0 degree draft angle over a first portion 714 of the circumference of the rivet 708 and a non-zero draft angle over a second portion 716 of the circumference of the rivet 708. Furthermore, the shoulder 710 has a greater radius over the first portion 714 than the second portion 716 of the circumference.

Although the tie rivets 100, 500, 600, and 700 are illustrated in the Figures as non-cutting tie rivets, it will be apparent that any of the tie rivets 100, 500, 600, and 700 may be cutter tie rivets in some embodiments. The cutter tie rivets may include a cutting edge and a depth gauge that extend up from the body of the cutting tie rivet.

Figure 8A:
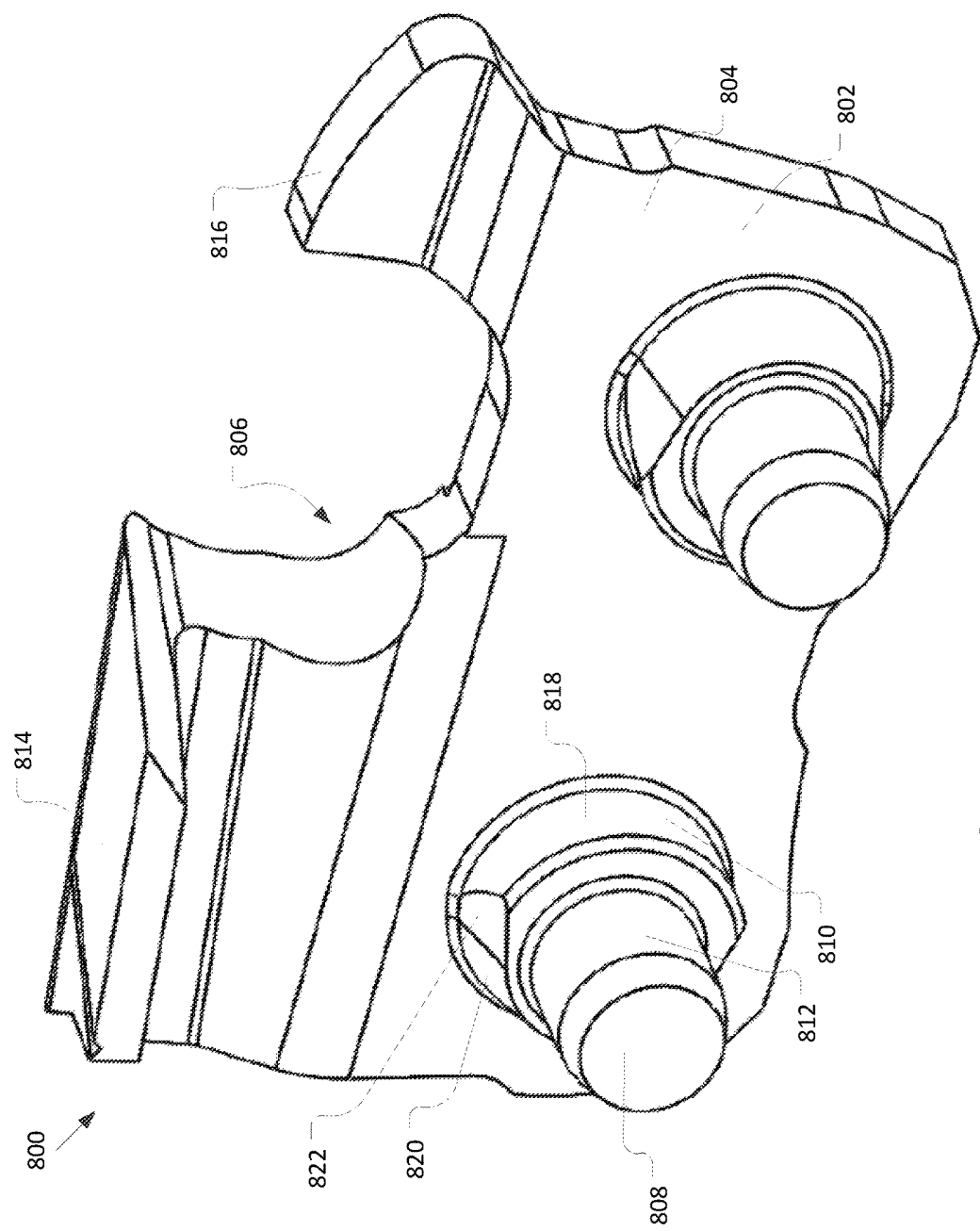
FIG. 8A illustrates a perspective view of a cutter tie rivet in accordance with various embodiments.
Figure 8B:
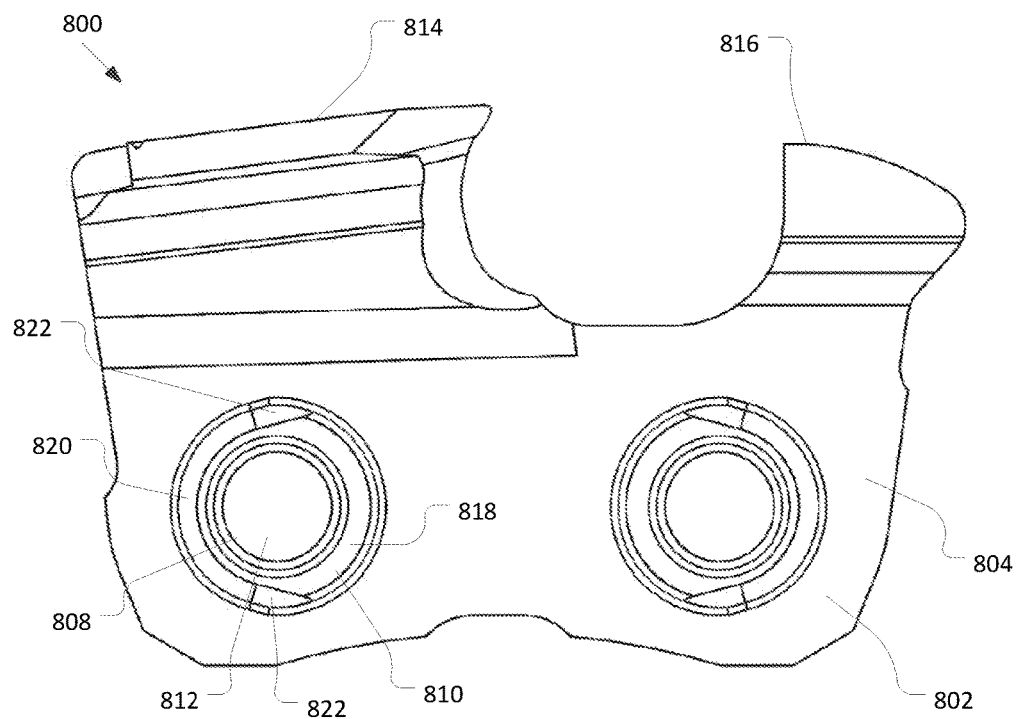
FIG. 8B illustrates a front view of the cutter tie rivet of FIG. 8A, in accordance with various embodiments.
Figure 8C:
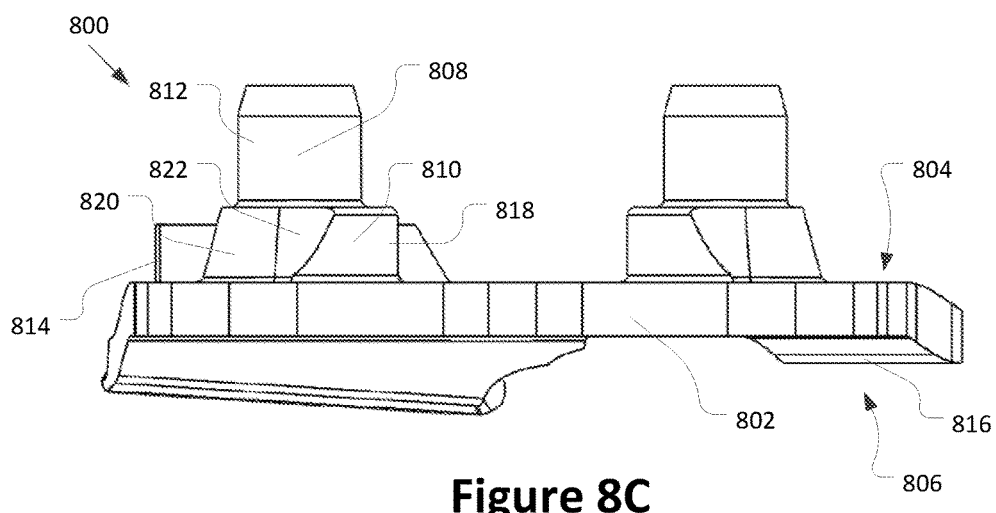
FIG. 8C illustrates a bottom view of the cutter tie rivet of FIG. 8A, in accordance with various embodiments.

For example, FIGS. 8A-8C illustrate a cutter tie rivet 800 in accordance with various embodiments. FIG. 8A illustrates a perspective view of the tie rivet 800, FIG. 8B illustrates a front view of the tie rivet 800, and FIG. 8C illustrates a bottom view of the tie rivet 800.

Cutter tie rivet 800 includes a body 802 with an inner surface 804 and an outer surface 806. Tie rivet 800 further includes integrated rivets 808 that extend from the inner surface 804. The integrated rivets 808 form a unitary piece with the body 802, as opposed to a separate tie strap and rivets. The integrated rivets 808 include a shoulder 810 and a hub 812. The shoulder 810 is disposed between the body 802 and the hub 812, and has a diameter that is larger than a diameter of the hub 812. The cutter tie rivet 800 further includes a cutting element 814 and a depth gauge 816 that extend up from the body 802.

In accordance with various embodiments, the shoulders 810 of the rivets 808 include a variable draft angle. For example, the shoulders 810 are shown in FIGS. 8A-8C with a 0 degree draft angle over a first portion 818 of the circumference of the rivet 808 and a non-zero draft angle over a second portion 820 of the circumference of the rivet 808. Transition portions 822 are disposed between the first portion 818 and second portion 820 and have a draft angle that transitions from the 0 degree draft angle of the first portion 818 to the non-zero draft angle of the second portion 820.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A tie rivet, comprising:
a body having an inner surface and an outer surface; and
an integrated rivet extending from the inner surface of the body, wherein the integrated rivet includes a shoulder configured to engage a rivet hole of a connecting link, wherein a side surface of the shoulder of the integrated rivet includes a circumferential inner portion having only a first draft angle and a circumferential outer portion having only a second draft angle, wherein the second draft angle is greater than the first draft angle, wherein the circumferential inner portion is located along an inner region of the integrated rivet arranged to face another rivet of the tie rivet, an opposing tie strap, or an opposing tie rivet and the circumferential outer portion is located along an outer region of the integrated rivet, wherein the first and second draft angles are measured as an angle between the side surface of the shoulder of the integrated rivet and a central longitudinal axis of the integrated rivet.

2. The tie rivet of claim 1, wherein the integrated rivet further includes a hub.

3. The tie rivet of claim 1, wherein the first draft angle is about 0 degrees.

4. The tie rivet of claim 1, further comprising a transition portion between the circumferential inner portion and the circumferential outer portion, wherein the side surface of the integrated rivet includes a draft angle that varies from the first draft angle to the second draft angle along the transition portion.

5. The tie rivet of claim 1, wherein the integrated rivet is a first integrated rivet, and wherein the tie rivet further includes a second integrated rivet extending from the inner surface of the body.

6. The tie rivet of claim 1, wherein the outer surface includes a recession opposite the integrated rivet.

7. The tie rivet of claim 1, wherein the second draft angle is about 1 to about 5 degrees.

8. A saw chain including the tie rivet of claim 1, and further including a drive link having a rivet hole disposed around the integrated rivet of the tie rivet.

9. The saw chain of claim 8, wherein the drive link is a drive cutter link having a sharpened cutting element and a tang.

* * * * *